(12) United States Patent
Patino et al.

(10) Patent No.: US 8,725,219 B2
(45) Date of Patent: May 13, 2014

(54) AUTOMATIC TRANSMIT MODE SELECTION FOR A COMMUNICATION DEVICE

(75) Inventors: Joseph Patino, Miramar, FL (US); Sergio Javier Berriz, Miami, FL (US)

(73) Assignee: BlackBerry Limited, Waterloo (CA)

( * ) Notice: Subject to any disclaimer, the term of this patent is extended or adjusted under 35 U.S.C. 154(b) by 108 days.

(21) Appl. No.: 13/448,132

(22) Filed: Apr. 16, 2012

(65) Prior Publication Data

US 2013/0273964 A1    Oct. 17, 2013

(51) Int. Cl.
*H04B 1/38* (2006.01)
*H01Q 11/12* (2006.01)
*H04B 1/04* (2006.01)
*H04B 1/16* (2006.01)

(52) U.S. Cl.
USPC ............ 455/574; 455/127.5; 455/343.5

(58) Field of Classification Search
USPC ........... 455/552.1, 574, 127.5, 343.1, 343.5; 370/311
See application file for complete search history.

(56) References Cited

U.S. PATENT DOCUMENTS

| 6,724,828 B1 | 4/2004 | Dabak |
| 7,610,495 B2 * | 10/2009 | Azadet et al. ............... 713/300 |
| 8,320,976 B2 * | 11/2012 | Nagasawa et al. ............ 455/574 |
| 2008/0278136 A1 | 11/2008 | Murtojarvi |
| 2009/0005094 A1 | 1/2009 | Lee et al. |
| 2010/0124880 A1 | 5/2010 | Wu et al. |
| 2010/0194632 A1 | 8/2010 | Raento et al. |
| 2010/0234060 A1 | 9/2010 | Beamish |

FOREIGN PATENT DOCUMENTS

| CA | 2807651 A1 | 10/2013 |
| EP | 1708369 A1 | 10/2006 |
| EP | 2654350 A1 | 10/2013 |
| FR | 2857195 A1 | 1/2005 |
| GB | 2411547 A | 8/2005 |
| WO | 0203733 A1 | 1/2002 |

OTHER PUBLICATIONS

Extended European Search Report mailed Sep. 14, 2012, in corresponding European patent application No. 12164249.0.
Response filed to Extended European Search Report from corresponding European Application No. 12164249.0 dated May 10, 2013.

* cited by examiner

*Primary Examiner* — Nguyen Vo
(74) *Attorney, Agent, or Firm* — Novak Druce Connolly Bove + Quigg LLP

(57) ABSTRACT

Various embodiments of systems and associated methods are described herein for providing automatic selection of an operating communication mode for a mobile communication device in which a communication mode is selected depending on various conditions including power pack voltage.

20 Claims, 6 Drawing Sheets

AUTOMATIC TRANSMIT MODE SELECTION FOR A COMMUNICATION DEVICE

FIELD

The various embodiments described herein generally relate to a mobile communication device with an associated method for selecting modes of wireless communication depending on power pack voltage.

BACKGROUND

Mobile communication devices such as mobile phones, personal data assistants, tablet computers, and the like are generally powered by a portable power pack, such as an internal rechargeable battery pack. The internal battery pack is an assembly of one or more batteries/cells that typically have a finite energy storage capacity.

Typically, the internal battery pack has a termination voltage (associated with a full charge). In operation while powering the mobile communication device, the voltage provided by the internal battery pack may be lower than the termination voltage. This decrease in voltage may be associated with a decrease in the charge held by the battery pack as it is discharged. In other cases, significant supply current requirements from various components of the mobile communication device can also cause a decrease in the charge.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and in which.

DETAILED DESCRIPTION OF THE EMBODIMENTS

Figure 1:
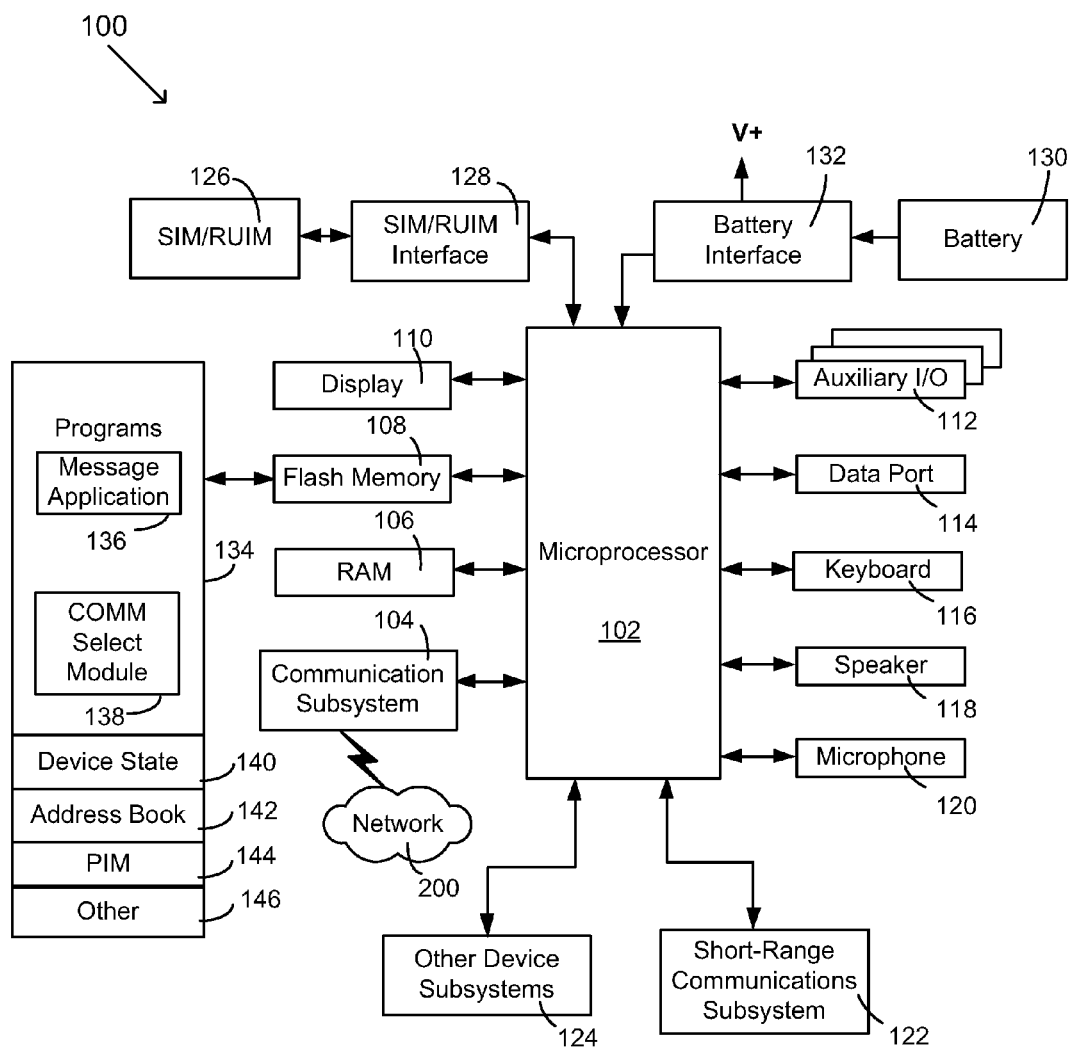
FIG. 1 is a block diagram of a mobile device.

As the mobile communication device operates, the voltage supplied by the power pack (which will for simplicity be described as a rechargeable internal battery pack) may decline over time. The voltage may eventually fall below one or more voltages that affect wireless communications. For example, standards such as US Federal Communication Commission (FCC) regulations and communication protocol specific standards may specify minimum voltage requirements (or a voltage threshold) for one or more communication modes. As used herein, a "communication mode" or "operating communication mode" refers to one or more set of associated conditions, or conditions under which wireless communication is or may be conducted. The conditions may be, but need not be, established by a regulatory authority such as the FCC. When a mobile device carries out a wireless communication, i.e. an operating communication mode, the communication mode may have associated with it an operating communication band (which may be thought of as a frequency, or set or range of frequencies, in which wireless communication takes place) and an operating communication protocol (which may be thought of generally as a way in which information is encoded) that are selected for the wireless communication. The communication mode may also have associated with it a voltage threshold. Below the voltage threshold, wireless communication in a particular band or with a particular protocol may not work well, or may be forbidden (e.g., forbidden by standard, by law or by carrier requirement). For example, communicating with a voltage below the minimum voltage requirement set by a particular standard may cause communication splatter, where the communication generates excessive noise and interferes with other communications being carried out in another communication mode. Also continuing to operate in this scenario will lead to degradation in the quality of the communication being carried out. In some circumstances, when the voltage of the power pack falls below the voltage threshold associated with the operating communication mode, the communication is terminated (in conventional language, the call gets dropped). Different communication modes need not be different in all respects; for example, two different communication modes may be associated with the same communication band, and a single voltage threshold may be associated with two or more different communication modes.

Described below are methods and apparatus directed to selection of operating communication modes and maintaining communication when the voltage of the power pack falls below the voltage threshold associated with the operating communication mode. In general, the communication device may be able to select a second communication mode as the operating communication mode. The second communication mode has an associated voltage threshold lower than the present voltage level of the power pack. By switching to the second communication mode, the communication may continue without being terminated (or may continue for a while). A voltage threshold associated with the operating communication mode may be a threshold prescribed by standard or regulation or practice for that communication mode, or may be a voltage level above or below the prescribed voltage level (for example, a voltage threshold may be the same as the prescribed voltage threshold, plus a little more).

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein. It should also be noted that the term coupled indicates that two elements can be directly coupled to one another or coupled to one another through one or more intermediate elements.

The detailed description begins with a general description of a mobile device and then proceeds to describe example embodiments of a method that can be used with the mobile device for automatically selecting a communication mode to deal with decreases in the power pack voltage. The power pack may be readily portable, that is, it may supply power to electronic components while being readily transportable from place to place and need not always be electrically connected to a substantially fixed power source such as an electrical outlet. Because the power pack is portable, a power pack typically has practical restrictions on size and weight, and carries a limited amount of power that the power pack may supply before being recharged or replaced. The power pack may include one or more cells that store energy chemically (such as a conventional battery), or a fuel cell system, or other energy storage elements, or any combination thereof. For purposes of simplicity, however, the power pack will be embodied as a rechargeable battery. For purposes such as convenience and aesthetics, the battery may be internal to the mobile device, that is, the battery may be inserted into or enclosed within the body or housing of the mobile device. As the power stored in the battery is depleted, the battery voltage may decrease, Using conventional techniques, decreases in battery voltage due to various reasons lead the mobile device to terminate wireless communication in a particular communication mode when the battery voltage is below the minimum voltage threshold or requirement associated with (e.g., required by, or set by the standards or regulation of) that communication mode. Example embodiments are described herein for managing decreases in the battery voltage such that the mobile device monitors the voltage currently being supplied by the battery when the device is carrying out wireless communication in a particular communication mode to detect when the battery voltage is below the minimum voltage requirement set by the standard that is pertinent to the particular communication mode. Another communication mode is then selected that has a lower minimum voltage requirement thereby allowing the mobile device to continue carrying out the wireless communication in the selected communication mode. Accordingly, the various example embodiments described herein allow the mobile device to avoid operating in a communication mode while the voltage of the mobile device power pack falls below a voltage threshold associated with the operating communication mode (which may violate minimum voltage requirements set by standards pertinent to that communication mode).

To aid the reader in understanding the structure of the mobile device, reference will be made to FIGS. 1 to 3. However, it should be understood that the embodiments described herein are not limited to a mobile device but can be extended to any electronic device that includes a radio for communicating wirelessly. Examples of such electronic devices generally include any portable electronic device with wireless communication abilities such as, but not limited to, cellular phones, cellular smart-phones, wireless organizers, personal digital assistants, computers, laptops, handheld wireless communication devices, wireless enabled notebook computers, tablet computers or e-readers, electronic security devices, wireless Internet appliances and the like. The electronic devices listed herein which are mobile are generally portable and thus may be battery-powered and may have limited power.

Referring now to FIG. 1, shown therein is a block diagram of one example of a mobile device 100. The mobile device 100 comprises a number of components, many of which may be housed in a body (not shown). The controlling component is a microprocessor (which may also be called a processor) 102, which controls the overall operation of the mobile device 100. Communication functions, including data and voice communications, are performed through a communication subsystem 104. The communication subsystem 104 receives messages from and sends messages to a wireless network 200. In this example, the communication subsystem 104 is configured in accordance with the Global System for Mobile Communication (GSM) and General Packet Radio Services (GPRS) standards. In other embodiments, the communication subsystem 104 can be configured to operate in accordance with one or more other communication standards as described below. New standards are still being defined, but it is believed that they will have similarities to the network behaviour described herein, and it will also be understood by persons skilled in the art that the various embodiments described herein should be able to be adapted to work with any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit-switched voice communications and packet-switched data communications.

Although the wireless network 200 associated with the mobile device 100 is a GSM/GPRS wireless network in this example embodiment, the mobile device 100 can be adapted to use other wireless networks in variant embodiments. For example, the different types of wireless networks that can be employed include, but are not limited to, data-centric wireless networks, voice-centric wireless networks, and dual-mode networks that can support both voice and data communications over the same physical base stations. Examples of networks also include, but are not limited to, Code Division Multiple Access (CDMA), CDMA2000 networks, GSM/GPRS networks, 3G networks like EDGE, W-CDMA and UMTS, 4G/LTE networks and future technologies such as 5G networks. Some other examples of data-centric networks include WiFi 802.11, Mobitex™ and DataTAC™ network communication systems. Examples of voice-centric data networks include Personal Communication Systems (PCS) networks like GSM and Time Division Multiple Access (TDMA) systems. Examples of communication protocols/standards that the mobile device 100 can be adapted to be used with include, but are not limited to, 3GPP and 3GPP2, High-Speed Packet Access (HSPA) standards such as High-Speed Downlink Packet Access (HSDPA), 3GPP LTE, LTE, LTE Advanced, WiMax, and Flash-OFDM. It should be noted that in some embodiments the mobile device 100 can be adapted to select between more than one communication protocol in use, as is described in further detail below.

The microprocessor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications subsystem 122 and other device subsystems 124.

Some of the subsystems of the mobile device 100 perform communication-related functions, whereas other subsystems can provide "resident" or on-device functions. By way of example, the display 110 and the keyboard 116 can be used for both communication-related functions, such as entering a text message for transmission over the network 200, and device-resident functions such as a calculator or task list. Operating system software used by the microprocessor 102 is typically stored in a persistent store such as the flash memory 108, which can alternatively be a read-only memory (ROM) or similar storage element (not shown). Those skilled in the art will appreciate that the operating system, specific device applications, or parts thereof, can be temporarily loaded into a volatile store such as the RAM 106.

The mobile device 100 can send and receive communication signals over the wireless network 200 after network registration or activation procedures have been completed.

Network access is associated with a subscriber or user of the mobile device 100. To identify a subscriber, the mobile device 100 may use a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services can include: web browsing and messaging such as e-mail, voice mail, SMS, and MMS. More advanced services can include: point of sale, field service and sales force automation. The SIM card/RUIM 126 includes a processor and memory for storing information. Once the SIM card/RUIM 126 is inserted into the SIM/RUIM interface 128, it is coupled to the microprocessor 102. In order to identify the subscriber, the SIM card/RUIM 126 contains some user parameters such as an International Mobile Subscriber Identity (IMSI). An advantage of using the SIM card/RUIM 126 is that a subscriber is not necessarily bound by any single physical mobile device. The SIM card/RUIM 126 can store additional subscriber information for a mobile device as well, including datebook (or calendar) information and recent call information. Alternatively, user identification information can also be programmed into the flash memory 108.

A power pack supplies power to electronic components of the mobile device 100. In the embodiment depicted in FIG. 1, the mobile device 100 is a battery-powered device and includes a battery interface 132 and uses one or more rechargeable batteries in a battery unit 130. The battery interface 132 is coupled to a regulator (not shown), which assists the battery unit 130 in providing power V+ to the mobile device 100. Alternatively, the battery unit 130 can be a smart battery as is known in the art. Smart batteries generally include a battery processor, battery memory, switching and protection circuitry, measurement circuitry and a battery pack that includes one or more batteries, which are generally rechargeable. In either case, the one or more batteries in the battery unit 130 can be made from lithium, nickel-cadmium, lithium-ion, or other suitable composite material.

The microprocessor 102, in addition to its operating system functions, enables execution of software applications 134 on the mobile device 100. The subset of software applications 134 that control basic device operations, including data and voice communication applications, will normally be installed on the mobile device 100 during its manufacture. When the microprocessor 102 is executing any of the software applications 134, the microprocessor 102 can be considered to be configured to execute a number of steps according to the methods specified by the code of the software applications 134.

The software applications 134 include a message application 136 that can be any suitable software program that allows a user of the mobile device 100 to send and receive electronic messages. Various alternatives exist for the message application 136 as is well known to those skilled in the art. Messages that have been sent or received by the user are typically stored in the flash memory 108 of the mobile device 100 or some other suitable storage element in the mobile device 100. In an alternative embodiment, some of the sent and received messages can be stored remotely from the device 100 such as in a data store of an associated host system that the mobile device 100 communicates with. For instance, in some cases, only recent messages can be stored within the device 100 while the older messages can be stored in a remote location such as the data store associated with a message server. This can occur when the internal memory of the device 100 is full or when messages have reached a certain "age", i.e. messages older than 3 months can be stored at a remote location. In an alternative embodiment, all messages can be stored in a remote location while only recent messages can be stored on the mobile device 100.

The mobile device 100 further includes a communication (COMM) select module 138, a device state module 140, an address book 142, a Personal Information Manager (PIM) 144, and other modules 146. The COMM select module 138 is used to control the adaptive selection of the operating communication mode for carrying out an ongoing wireless communication. The functions performed by the COMM select module 138 generally include storing or accessing the communication modes that can be used, and the voltage thresholds associated to each stored communication mode, monitoring the battery voltage, and, when required, selecting another communication mode for continuing the wireless communication. The operation of the COMM select module 138 is discussed in further detail below.

The device state module 140 provides persistence, i.e. the device state module 140 ensures that important device data is stored in persistent memory, such as the flash memory 108, so that the data is not lost when the mobile device 100 is turned off or loses power. The address book 142 provides information for a list of contacts for the user. For a given contact in the address book 142, the information can include the name, phone number, work address and email address of the contact, among other information. The other modules 146 can include a configuration module (not shown) as well as other modules that can be used in conjunction with the SIM/RUIM interface 128.

The PIM 144 has functionality for organizing and managing data items of interest to a subscriber, such as, but not limited to, e-mail, calendar events, voice mails, appointments, and task items. A PIM application has the ability to send and receive data items via the wireless network 200. PIM data items can be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

Additional applications can also be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and can provide enhanced on-device functions, communication-related functions, or both. For example, secure communication applications can enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path can, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the mobile device 100.

The short-range communications subsystem 122 provides for communication between the mobile device 100 and different systems or devices, without the use of the wireless network 200. For example, the subsystem 122 can include an infrared device and associated circuits and components for short-range communication. Examples of short-range communication include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the microprocessor 102. The microprocessor 102 will then process the received signal for output to the display 110 or alternatively to the auxiliary I/O subsystem 112. A subscriber can also compose data items, such as e-mail messages, for example, using the keyboard 116 in conjunction with the display 110 and possibly the auxiliary I/O subsystem 112. The auxiliary subsystem 112 can include devices such as a touch screen, mouse, track ball, infrared fingerprint detector, or a roller wheel with dynamic button pressing capability. The keyboard 116 is preferably an alphanumeric keyboard and/or telephone-type keypad. However, other types of keyboards can also be used. A composed item can be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
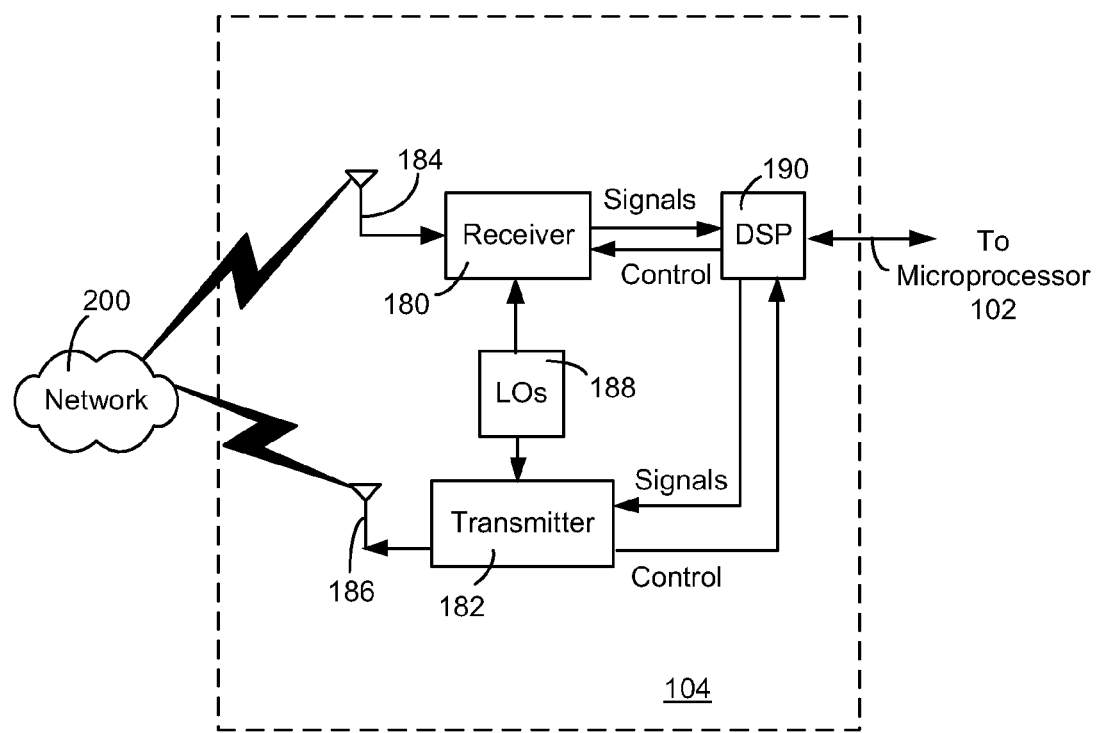
FIG. 2 is a block diagram of an example embodiment of a communication subsystem component of the mobile device of FIG. 1.

Referring now to FIG. 2, a block diagram of the communication subsystem component 104 of FIG. 1 is shown. Communication subsystem 104 comprises a receiver 180, a transmitter 182, one or more embedded or internal antenna elements 184 and 186, Local Oscillators (LOs) 188, and a processing module such as a Digital Signal Processor (DSP) 190.

The particular design of the communication subsystem 104 is dependent upon the network 200 in which the mobile device 100 is intended to operate; thus, it should be understood that the design illustrated in FIG. 2 serves only as one example. Signals received by the antenna 184 through the network 200 are input to the receiver 180, which may perform such common receiver functions as signal amplification, frequency down conversion, filtering, channel selection, and analog-to-digital (A/D) conversion. A/D conversion of a received signal allows more complex communication techniques such as demodulation and decoding to be performed in the DSP 190. In a similar manner, signals to be transmitted are processed, including modulation and encoding, by the DSP 190. These DSP-processed signals are input to the transmitter 182 for digital-to-analog (D/A) conversion, frequency up conversion, filtering, amplification and transmission over the network 200 via the antenna 186. The DSP 190 not only processes communication signals, but also provides for receiver and transmitter control. For example, the gains applied to communication signals in the receiver 180 and the transmitter 182 may be adaptively controlled through automatic gain control algorithms implemented in the DSP 190.

The wireless link between the mobile device 100 and a network 200 may contain one or more different channels, typically different RF channels, established over one of several frequency bands, also called communication bands. For example a wireless link may contain the 850 MHz, 900 MHz, 1800 MHz, and 1900 MHz communication bands, typically used in North America. The wireless link also contains the associated communication protocols used between the mobile device 100 and the network 200. An RF channel is a limited resource that must be conserved, typically due to limits in overall bandwidth and limited battery power of the mobile device 100.

A wireless communication is carried out over the wireless link established between the mobile device 100 and the network 200. One communication band from the established communication bands of the wireless link is selected for carrying out the wireless communication. Likewise, one communication protocol from the associated communication protocols is selected for carrying out the wireless communication. For ease of reference, the communication band that is selected will be hereinafter referred to as the "operating communication band" and the communication protocol that is selected will be hereinafter referred to as the "operating communication protocol". The combination of the operating communication band and the operating communication protocol are hereinafter denoted as the operating communication mode for carrying out the wireless communication.

When the mobile device 100 is fully operational, the transmitter 182 is typically keyed or turned on only when it is sending to the network 200 and is otherwise turned off to conserve resources. Similarly, the receiver 180 is periodically turned off to conserve power until it is needed to receive signals or information (if at all) during designated time periods.

Figure 3:
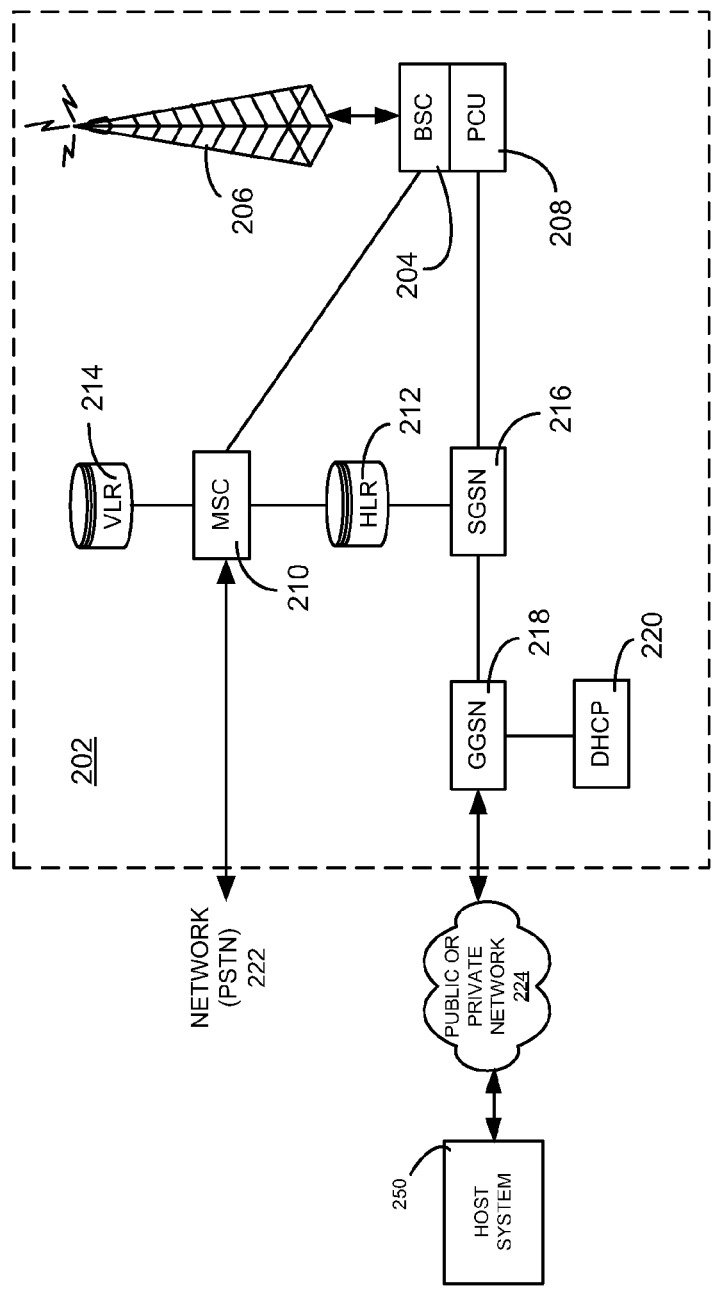
FIG. 3 is a block diagram of a node of a wireless network in one example embodiment.

Referring now to FIG. 3, a block diagram of a node of a wireless network is shown as 202. In this example embodiment, the network and its components are described for operation with General Packet Radio Service (GPRS) and Global Systems for Mobile (GSM) technologies. However, it should be understood that in other embodiments the network can be implemented in accordance with one or more other communication protocols. In practice, the network 200 comprises one or more nodes 202. The mobile device 100 communicates with a node 202 within the wireless network 200. The node 202 is configured in accordance with GPRS and GSM technologies. The node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through the network 200.

In a GSM network, the MSC 210 is coupled to the BSC 204 and to a landline network, such as a Public Switched Telephone Network (PSTN) 222 to satisfy circuit switched requirements. The connection through the PCU 208, the SGSN 216 and the GGSN 218 to the public or private network (Internet) 224 (also referred to herein generally as a shared network infrastructure) represents the data path for GPRS capable mobile devices. In a GSM network extended with GPRS capabilities, the BSC 204 also contains a Packet Control Unit (PCU) 208 that connects to the SGSN 216 to control segmentation, radio channel allocation and to satisfy packet switched requirements. To track mobile device location and availability for both circuit switched and packet switched management, the HLR 212 is shared between the MSC 210 and the SGSN 216. Access to the VLR 214 is controlled by the MSC 210.

The station 206 may be a fixed transceiver station in which case the station 206 and the BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 206. The fixed transceiver equipment normally performs such functions as modulation and possibly encoding and/or encryption of signals to be transmitted to the mobile device in accordance with particular communication protocols and parameters, under control of its controller. The fixed transceiver equipment similarly demodulates and possibly decodes and decrypts, if necessary, any communication signals received from the mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in the HLR 212. The HLR 212 also contains location information for each registered mobile device and can be queried to determine the current location of a mobile device. The MSC 210 is responsible for a group of location areas and stores the data of the mobile devices currently in its area of responsibility in the VLR 214. Further the VLR 214 also contains information on mobile devices that are visiting other networks. The information in the VLR 214 includes part of the permanent mobile device data transmitted from the HLR 212 to the VLR 214 for faster access. By moving additional information from a remote node of the HLR 212 to the VLR 214, the amount of traffic between these nodes can be reduced so that voice and data services can be provided with faster response times while at the same time using less computing resources.

The SGSN 216 and the GGSN 218 are elements added for GPRS support; namely packet switched data support, within GSM. The SGSN 216 and the MSC 210 have similar responsibilities within wireless network 200 by keeping track of the location of each mobile device 100. The SGSN 216 also performs security functions and access control for data traffic on the network 200. The GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, GPRS capable networks use private, dynamically assigned IP addresses and thus use a DHCP server 220 connected to the GGSN 218. There are many mechanisms for dynamic IP assignment, including using a combination of a Remote Authentication Dial-In User Service (RADIUS) server and a DHCP server. Once the GPRS Attach is complete, a logical connection is established from a mobile device 100, through the PCU 208 and the SGSN 216 to an Access Point Node (APN) within the GGSN 218. The APN represents a logical end of an IP tunnel that can either access direct Internet compatible services or private network connections. The APN also represents a security mechanism for the network 200, insofar as each mobile device 100 must be assigned to one or more APNs and the mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, the network 200 will run an idle timer for each PDP Context to determine if there is a lack of activity. When a mobile device 100 is not using its PDP Context, the PDP Context can be deallocated and the IP address returned to the IP address pool managed by the DHCP server 220.

The host system 250 may be a corporate enterprise or other local area network (LAN), but may also be a home office computer or some other private system, for example, in variant embodiments. In some cases, the host system 250 may represent a smaller part of a larger network of an organization. Typically, mobile devices communicate wirelessly with the host system 250 through one or more of the nodes 202 of the wireless network 200. The host system 250 may include one or more routers and computing devices that may operate from behind a firewall or proxy server. The proxy server routes data to the correct destination server(s) within the host system 250. For instance, the host system 250 may include a message server to send and receive messages to the mobile devices and a message management server that controls when, if, and how messages are sent to the mobile devices. The host system 250 can also include other servers that provide various functions for the host system 250 as well as data stores or databases.

When the mobile device 100 carries out a wireless communication, an operating communication mode comprising an operating communication band and an operating communication protocol is selected for the wireless communication. This wireless communication carried out in the operating communication mode will have a minimum voltage requirement set by various regulations or standards as previously described. When the battery voltage drops below the minimum voltage requirement for the operating communication mode, the wireless communication should cease using the operating communication mode. Ceasing communication may be prescribed by one or more standards or regulations to avoid undesirable effects. These undesirable effects include communication splatter, where the communication generates excessive noise and interferes with other communications being carried out in another communication mode as well as degradation in the quality of the communication being carried out.

According to the various embodiments described herein, the COMM select module 138 of the mobile device 100 is configured to monitor the present voltage of the battery 130 (that is, the substantially contemporaneous or currently existing voltage) to determine if there is a drop in the voltage below a voltage threshold associated with the operating communication mode (that may cause the mobile device 100 to not meet minimum voltage requirements for the operating communication mode). The determination of whether there is a drop below a threshold may be performed by any component, such as a dedicated component (like a comparator or logic circuitry), but for purposes of illustration it will be assumed that the determination takes place in the COMM select module 138 executing on the microprocessor 102. The COMM select module 138 receives an input signal representing the present battery voltage level information. In some cases, the input signal can be received from the battery interface 132. The input signal representing the present battery voltage level is typically an electrical signal, which may be in any format, and is received on an input signal terminal. The COMM select module 138 uses the present battery voltage level information to determine whether the minimum voltage requirements will not be met if the mobile device were to continue carrying out the wireless communication in the operating communication mode. If this is the case, the COMM select module 138 automatically selects another communication mode having a lower minimum voltage threshold (which may be deemed a lower minimum voltage requirement) and for which the present battery voltage will allow complying with that minimum voltage requirement. The COMM select module 138 then sets the other communication mode as the new operating communication mode. The COMM select module 138 also provides one or more control signals as output signals. A control signal, which may be an electrical signal in any format, is supplied or transmitted or otherwise conveyed to other components via an output signal terminal. Control signals may correspond to the selected operating communication mode to one or more other components of the mobile device 100 to cause these other components, for example the communication subsystem 104, to carry out wireless communication in the selected operating communication mode. For example, the COMM select module 138 can provide the control signals to the DSP 190 which can then configure the receiver 180, the transmitter 182 or the local oscillators 188 to operate according to the selected operating communication mode. The wireless communication is then continued to be carried out in the newly selected operating communication mode. Meanwhile, the COMM select module 138 continues to monitor the present battery voltage to determine if the minimum voltage requirement for the newly selected operating communication mode can be met, and automatically selects another communication mode for carrying out the wireless communication mode if required.

In some embodiments, the functionality of the COMM select module 138 is provided by the microprocessor 102, wherein the microprocessor 102 controls the automatic selection of operating communication modes for carrying out a wireless communication. In these embodiments, an input of the microprocessor 102 is coupled to the battery interface 132 to obtain battery voltage level information in order to adequately monitor the battery voltage. Alternatively, an input of the microprocessor 102 may be coupled to another component of the mobile device 100 that provides reliable battery voltage level information. The microprocessor 102 then controls the automatic selection of the operating communication mode and outputs control signals to cause other components of the mobile device 100, such as the DSP 190, to switch to the operating communication mode to carry out the wireless communication.

In other embodiments, the COMM select module 138 may be implemented as a stand-alone module in hardware in which case the COMM select module 138 has an input signal terminal to receive the battery voltage level information and an output signal terminal to transmit control signals to cause other components of the mobile device 100 to switch to the operating communication mode to carry out the wireless communication. In these embodiments, a processor can be used or specialized logic circuitry can be used that is configured to perform the functions of the automatic communication mode selection techniques described herein. In addition, in these embodiments there may be at least one A/D converter that can be used to obtain the measured battery voltage.

Figure 4:
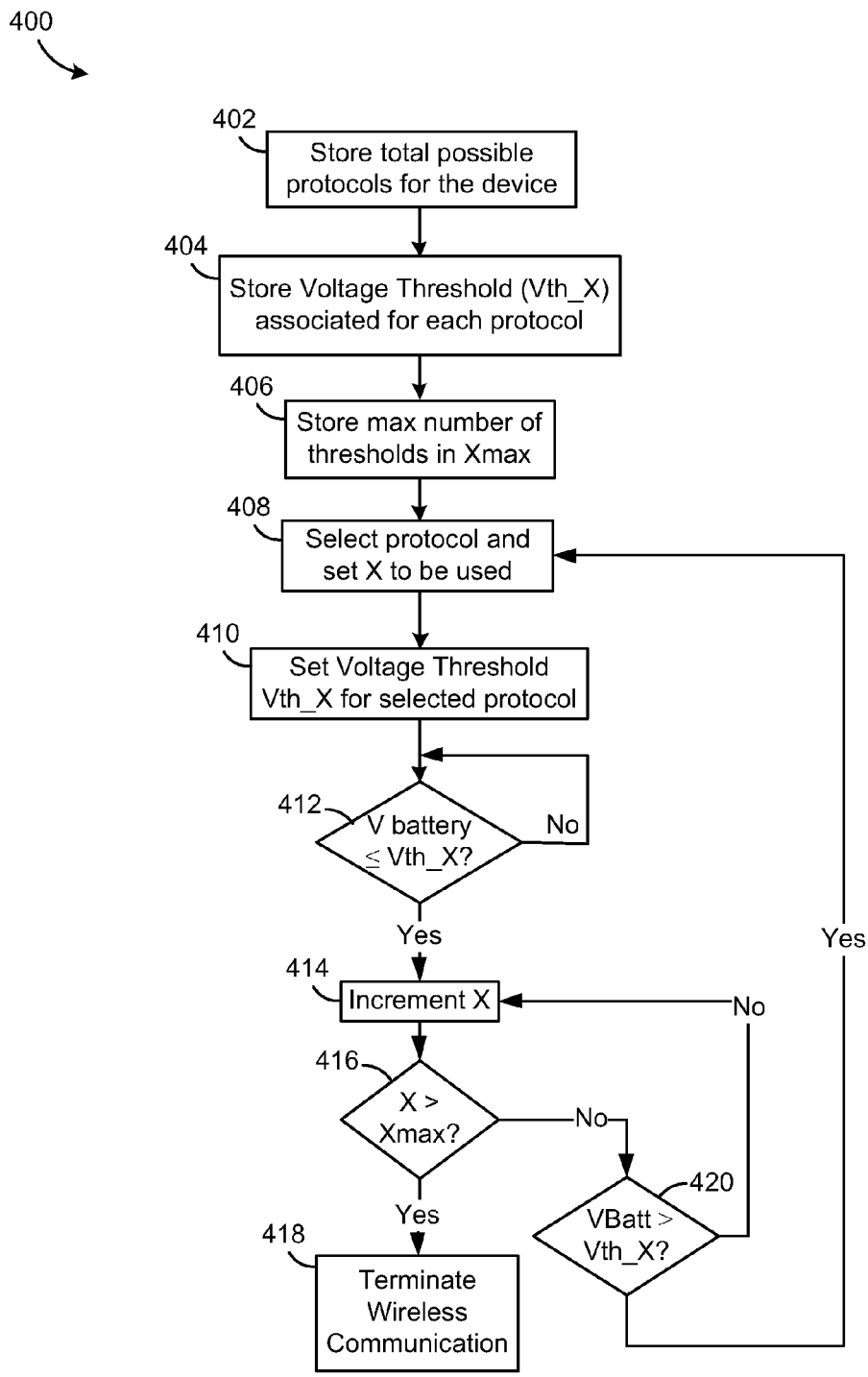
FIG. 4 is a flowchart of an example embodiment for automatic selection of a communication mode.
Figure 5:
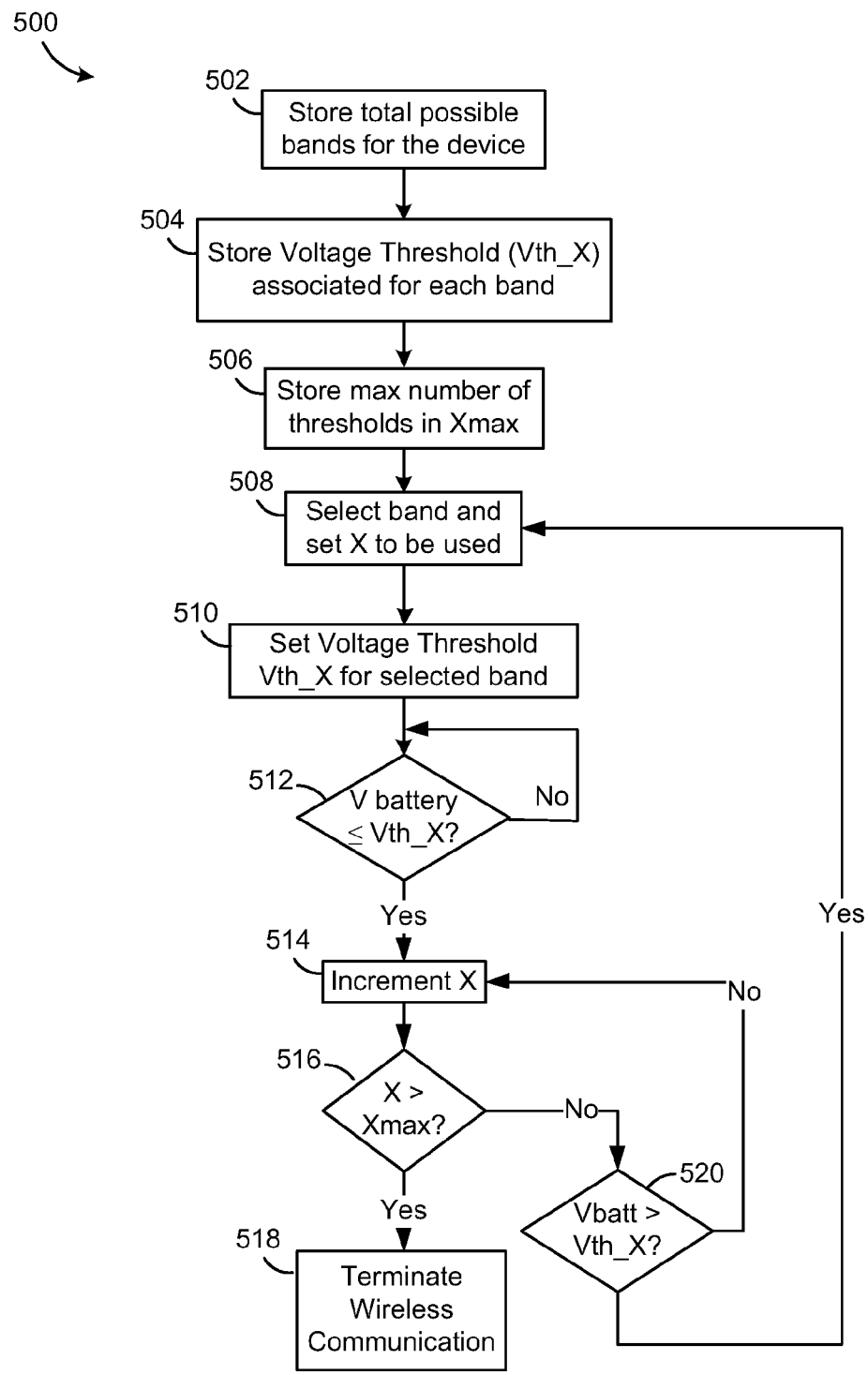
FIG. 5 is a flowchart of another example embodiment for automatic selection of a communication mode.
Figure 6:
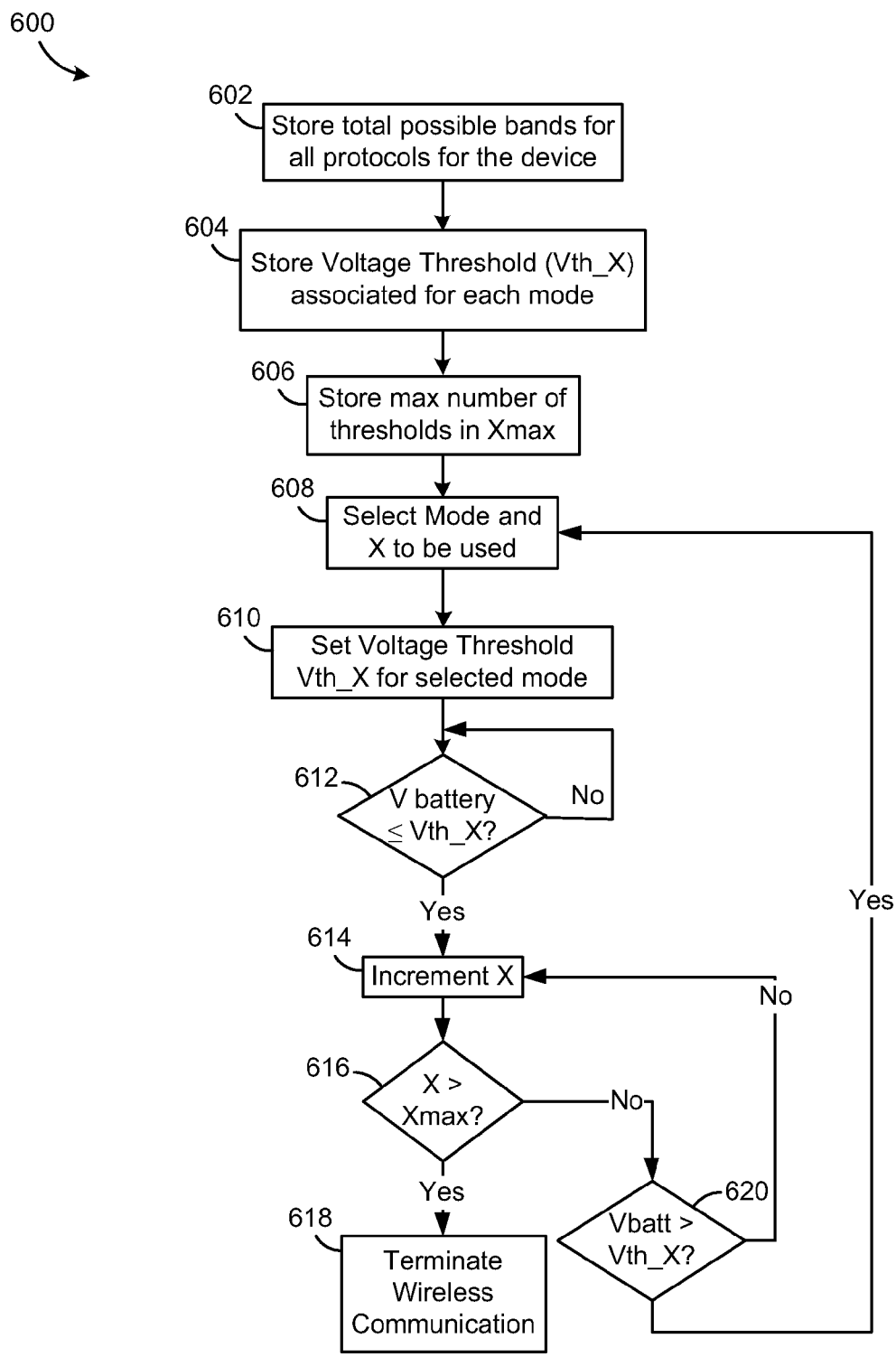
FIG. 6 is a flowchart of another example embodiment for automatic selection of a communication mode.

Referring now generally to FIGS. 4-6, illustrated therein are example embodiments of a method for controlling the automatic selection of an operating communication mode for carrying out an ongoing wireless communication. These methods can be performed by the COMM select module 138 or the microprocessor 102 when executing the functionality of the COMM select module 138. Alternatively, other dedicated hardware may be configured to perform these methods.

Referring now to FIG. 4, illustrated therein is an example embodiment of a method 400 for controlling the automatic selection of an operating communication mode for carrying out an ongoing wireless communication. In this example embodiment, the communication may be carried out in communication modes having only one communication band that is selected as the operating communication band but there are various communication protocols that can be used as the operating communication protocol. Accordingly, in this example embodiment, the communication mode can be selected from various communication protocols for a common communication band.

A scenario where the wireless communication can be carried out in only one communication band may exist where the mobile device 100 is located in an area where the wireless link between the mobile device 100 and the network 200 only contains one communication band. This may be the case, for example, in rural areas where the network 200 is only adapted to work in a single communication band. Alternatively, it may be desirable to limit the wireless link to contain only a single band, for example, when there is traffic on other available bands.

While the mobile device 100 is configured to be able to be operable in many communication modes, depending on the wireless link established between the mobile device 100 and the network 200, it may be possible to only use some of the these communication modes for carrying out a given wireless communication.

At 402, the total possible communication modes for carrying out the wireless communication using the mobile device 100 are stored. Since the total possible communication modes all have the same operating communication band, the total possible communication protocols usable with the operating communication band are stored at 402.

In other embodiments, only some of the communication modes of the total possible communication modes are stored at 402. In this case, where the total possible communication modes all have the same operating communication band, a subset of the total possible communication protocols usable with the communication band is stored at 402. This may be the case where it is desirable to restrict some of the usable communication protocols, for example, due to wireless communication conditions such as traffic in use on other protocols. In another case, the type of wireless communication, for example voice or data, may limit the number of protocols available for use at the operating communication band.

In some embodiments, storing of the possible communication modes for carrying out the wireless communication at 402 may occur during initiation of the wireless communication. As the wireless communication is being initiated, an operating communication band that is selected for carrying out the communication is detected and the total possible communication protocols that are usable with the operating communication band is retrieved. Wireless conditions, such as traffic on certain communication protocols are also detected. In some cases, data rate efficiency for the various communication protocols can also be determined. Data rate efficiency can be determined based on how much data can be sent using the communication protocol which depends on traffic as well as the error rate; if both are low then the data rate efficiency is high. The data rate efficiency can also be measured for different bands (useful for method 500 of FIG. 5) or a combination of bands and wireless communication protocols (useful for method 600 of FIG. 6). Based on the detected wireless conditions present during initiation, a subset of the total possible communication protocols with the selected communication band is stored at 402. This subset then constitutes the possible communication protocols that can be selected as an operating communication protocol for carrying out the wireless communication. The possible communication modes for carrying out the wireless communication stored at 402 may be stored in the flash memory 108 or temporarily in the RAM 106. However, in other embodiments, this determination of wireless conditions is optional and may not be performed.

The possible communication modes may be stored at 402 in a preferred order. For example, communication modes may be ordered based on decreasing order of preference of communication mode. This preference may be due to data rate efficiency or quality of the wireless communication which can be determined based on Signal to Noise Ratio (SNR), for example. Alternatively, communication modes may be ordered based on decreasing or increasing order of the voltage threshold associated with each of the modes that are stored at 404. To keep track of each communication mode in the order of modes stored at 402, each communication mode may have an associated index number, for example mode(X), where $X=1, 2, 3, \ldots$, etc.

At 404, one voltage threshold is associated to each of the communication modes stored at 402. Each of the voltage thresholds are then stored while maintaining the association with the communication mode. For example, the voltage threshold may be logically stored such that $Vth(X)$ represents the voltage threshold associated with the communication mode having the index number X.

In some embodiments, the voltage threshold associated with each of the communication modes that the mobile device 100 is configured to operate in may be stored, for example in memory 106, at some time prior to initiation of wireless communication. For example, each communication mode and the associated voltage threshold may be stored in a look-up table in the flash memory 108. These stored voltage thresholds may be periodically updated, for example through firmware updates of the mobile device 100, to be current with minimum voltage regulations set by standards. In these embodiments, after storing the communication protocol to be used for the operating communication band for carrying out the wireless communication at 402, the voltage thresholds associated for each chosen communication mode can be easily retrieved and then stored at 404.

In other embodiments, in contrast to being stored, voltage thresholds associated for each communication protocol may be computed during initiation of the wireless communication based on the conditions of the mobile device 100 and current wireless conditions present during initiation.

The associated voltage threshold for each communication mode represents the minimum voltage that the battery 130 must provide in order for the wireless communication to conform to the minimum voltage requirements for the operating communication mode. Continuing the wireless communication in the operating communication mode when a battery voltage drops below the associated threshold for that communication mode may cause violation of regulations and standards, or may otherwise be prohibited or unworkable or undesirable.

In some embodiments, the voltage threshold for each communication mode equals the minimum voltage requirements set for that mode. In alternative embodiments, the associated voltage thresholds may be higher or lower than the minimum voltage requirements to compensate for battery usage by other components of the mobile device 100 that may affect the battery voltage. In fact the associated voltage thresholds may be adjusted higher depending on customer requirements. It may also be advantageous to have an associated voltage threshold higher than the minimum voltage requirement set by, for example, a standard or regulation, in order to allow a drop in the battery voltage to be detected in time and to perform automatic selection of another communication mode for carrying out the wireless communication before a violation of the minimum voltage requirements of that standard or regulation occurs.

At 406, a "drop" threshold is set for the wireless communication. The drop threshold refers to the threshold for terminating the wireless communication. The drop threshold may be set in numerous ways. For example in FIG. 4, the drop threshold is stored as Xmax, representing the maximum index X that can be reached before a wireless communication is terminated. In embodiments, where the communication modes to be used are stored according to order of preference, Xmax may represent the maximum number of modes that are used, or are tried to be used, before the wireless communication is terminated. In other embodiments, where the communication modes to be used are stored in decreasing order of associated voltage thresholds, Xmax may simply represent the index number of the communication mode having the index Xmax that also has the lowest associated voltage threshold. In most cases, Xmax should correspond to the number of possible communication modes that are stored at 402 such that if Xmax is reached, then all possible communication modes will have been exhausted and no other communication modes remain to be set or selected as the operating communication mode for continuing the wireless communication.

At 408, a communication mode is selected from the total possible communication modes stored at 402 as the operating communication mode. An initial operating communication mode is selected during initiation of the wireless communication. The initial operating communication mode may represent the communication mode that provides the highest quality and reliability for the wireless communication. A current index X is set to equal the index number of the operating communication mode to track its order in the logical order of total possible communication modes stored at 402.

At 410, the voltage threshold $Vth(X)$ associated to the operating communication mode is retrieved using the index X and set as the operating voltage threshold. If the battery voltage falls below this operating voltage threshold, another communication mode should be selected for continuing the wireless communication, or in some cases, the communication should be dropped. The communication can be a phone call or a data communication. From the user's point of view, continuing the communication may be desirable for a number of reasons. Terminated or dropped communications can be an annoyance or more serious than an annoyance. Continuing carrying out the wireless communication in another communication mode can be achieved without terminating the communication, can be done automatically, and can be done without the user being aware that wireless communication is continuing in another communication mode (although the user may be notified, e.g., by a notice on the display 110 or an audible indication via the speaker 118, that power is running low). Further, the amount of time that a user can talk or otherwise communicate may be extended, and there may be an improved likelihood that the wireless communication may be terminated when the wireless communication is complete (e.g., when the data to be transmitted or received has been has transmitted or received, or when the user gives the command to "hang up" a phone call).

At 412, the COMM select module 138 continuously monitors the present voltage of the battery 130 to determine if the present battery voltage drops below the operating voltage threshold. It will be appreciated that while monitoring is characterized as being "continuous", the monitoring may actually be performed in a substantially continuous or periodic manner, with the monitoring of the present battery voltage being performed with sufficient frequency to ensure that a drop in the present battery voltage below the operating voltage threshold can be detected in a timely manner to avoid falling below the voltage threshold associated with the current operating communication mode. Monitoring the present battery voltage typically includes periodically and repeatedly determining if a presently detected battery voltage is below the operating threshold voltage while a wireless communication is being performed.

The COMM select module 138 monitors the present voltage of the battery 130 based on an input signal that provides the battery voltage level information. The battery voltage level information may be received from an output of the battery interface 132. Alternatively, the battery voltage level information may be received from the communication subsystem 104, for example the battery voltage provided to a pre-amplification stage used in the transmitter 182 of the communication subsystem 104. It will be appreciated that the battery voltage level information received by the COMM select module 138 may be different depending on which components of the mobile device 100 provide the information. Consequently, the voltage thresholds associated to each communication mode can be adjusted depending on which component of the mobile device 100 provides the battery voltage level information.

At 414, once it has been determined that the battery voltage is below the voltage threshold for the current operating communication mode, another communication mode is chosen as a candidate communication mode for continuing the wireless communication. In cases where the index X is used to track the communication modes within the list of possible communication modes, X is incremented by 1 to choose the next communication mode in the order of possible communication modes as the candidate communication protocol.

At 416, it is determined whether the drop threshold has been reached. In embodiments where the drop threshold represents a minimum voltage threshold, any time it is determined that the battery voltage has dropped below the operating voltage threshold, it is also determined whether the present battery voltage has dropped below the drop threshold. If it is determined that the present battery voltage has also dropped below the drop threshold, the wireless communication should be terminated. It should be noted that when checking for a voltage drop in general, successive readings of battery voltages are monitored to ensure that the voltage drop is not just a temporary anomaly (in which case the battery voltage will recover) but rather is indicative of a permanent drop in battery voltage. This is true for methods 500 and 600 as well.

Alternatively, if the index X is used for denoting the operating communication mode in the order of possible communication modes stored at 402 and Xmax represents the drop threshold, then it is determined at 416 if after incrementing X at 414 whether X is now greater than Xmax. If X is greater than Xmax, then the drop threshold has been reached and the wireless communication should be terminated.

If it is determined at 416 that the wireless communication should be terminated, then at 418 the wireless communication is terminated. The wireless communication can be a phone call in which case the call is dropped as shown in FIG. 4. However, there can be cases in which the wireless communication is a data transfer in which case the data transfer is stopped. When the wireless communication is terminated, a message can be provided to the user that the battery voltage is too low to continue the wireless communication and that the battery should be recharged.

If it is determined at 416 that the drop threshold has not been reached, it is further determined at 420 whether the candidate communication mode is suitable for continuing the wireless communication. The suitability of the candidate communication mode is determined based on whether the present battery voltage is greater than the voltage threshold associated to the candidate communication mode. A present battery voltage that is greater than the voltage threshold associated with the candidate communication mode signifies that wireless communication may be continued in the candidate communication mode without falling below the voltage threshold associated with that communication mode. In this case, the method 400 returns to 408 and the candidate communication mode is set as the operating communication mode and the threshold voltage associated to the candidate communication mode is set as the operating voltage threshold. Monitoring of the present battery voltage against the operating voltage threshold is then continued for the newly-set operating communication mode and the newly-set operating voltage threshold.

In some cases, it may be determined at 420 that the present battery voltage is lower than the voltage threshold associated to the candidate communication protocol. This may occur if there has been a significant drop in the battery voltage such that even where the possible communication protocols are stored in decreasing order of value of associated voltage thresholds, the candidate communication mode does not have a sufficiently low associated voltage threshold. In other embodiments where the possible communication modes stored at 402 are ordered in order of preferred communication modes, the candidate communication protocol may actually have an associated threshold voltage greater than the operating voltage threshold and would not be suitable for selection as the operating communication mode.

If it is determined at 420 that the present battery voltage is lower than the voltage threshold associated with the candidate communication mode, the method 400 returns to 414 to select or choose another candidate communication mode.

It will be appreciated that finding a candidate communication mode that is suitable for selection as the operating communication mode may require determining the suitability of several candidate communication modes. This process requires retrieving the voltage thresholds associated to each of the possible communication modes stored after the operating communication mode in the order of possible communication modes stored at 402 until a suitable communication mode is found. However, other techniques of searching through the candidate communication bands are also possible in alternative embodiments. For each retrieved voltage threshold, it is determined whether the associated threshold voltage is less than the present battery voltage. If the retrieved associated voltage threshold is less than the present battery voltage, then the candidate communication mode having the retrieved associated voltage will be selected as the operating communication mode.

Referring now to FIG. 5, illustrated therein is an example embodiment of a method 500 for controlling the automatic selection of an operating communication mode for carrying out an ongoing wireless communication. The communication is carried out in communication modes having the same communication protocol but varying communication bands. It will be appreciated that the method 500 is analogous to the method 400 and it will be understood that description provided above relating to the method 400 may be adapted to the method 500.

A scenario where the wireless communication can be carried out in only one communication protocol may exist where the mobile device 100 is implemented to carry out wireless communication using only one communication protocol. It is also possible that the mobile device 100 may be located in an area where the network 200 can only establish a wireless link using a certain communication protocol. Furthermore, it may be desirable to limit the wireless link to use only a single protocol, for example, where there is too much traffic using other available protocols.

At 502, the total possible communication modes for carrying out the wireless communication using the mobile device 100 are stored. Since the total possible communication modes all have the same operating communication protocol, only the total possible communication modes usable with the operating communication band are stored at 502. This can be determined based on wireless conditions, such as traffic and data rate efficiency as explained previously.

In other embodiments, only some of the communication modes of the total possible communication modes are stored at 502. In this case, since the total possible communications all have the same operating communication protocol, a subset of the total possible communication bands usable with the communication protocol is stored at 502. This may be the case where it is desirable to restrict some of the usable communication bands, for example, due to wireless communication conditions such as traffic in use on other bands or data rate efficiency. In another case, the type of wireless communication, for example voice or data, may limit the number of bands available for use at the operating communication protocol.

At 504, one voltage threshold is associated to each of the communication bands stored at 502. Each of the voltage thresholds are then stored while maintaining the association with the communication band. For example, the voltage threshold may be logically stored such that Vth(X) represents the voltage threshold associated with the communication band having the index number X.

At 506, a drop threshold is set for the wireless communication. The drop threshold may be set in a way analogous to the setting of the drop threshold at 406 of the method 400.

At 508, a communication band is selected from the possible communication bands stored at 502 as the operating communication band.

At 510, the voltage threshold Vth(X) associated to the operating communication band is retrieved using the index X and set as the operating voltage threshold. If the battery voltage falls below this operating voltage threshold, another communication band should be selected for continuing the wireless communication, or in some cases, the wireless communication should be dropped.

At 512, the COMM select module 138 monitors the present voltage of the battery 130 to determine if the present battery voltage drops below the operating voltage threshold. This monitoring is analogous to the monitoring performed at 412.

At 514, because the battery voltage level has dropped below the operating threshold voltage for the current operating communication mode, another communication band is probed as a candidate communication band for continuing the wireless communication being carried out in the selected communication protocol. Since the index X is used to track the operating communication band within the list of possible communication bands, X is incremented by 1 to choose the next communication band in the order of possible communication bands as the candidate communication band.

At 516, it is determined whether the drop threshold has been reached. This determination is analogous to the determination made at 416.

If it is determined at 516 that the wireless communication should be terminated, then at 518 the wireless communication is terminated.

If it is determined at 516 that the drop threshold has not been reached, it is further determined at 520 whether the candidate communication band is suitable for continuing the wireless communication. The determination of the suitability of the candidate communication band is analogous to the determination performed at 420.

If it is determined at 520 that the present battery voltage is lower than the voltage threshold associated with the candidate communication band, the method 500 returns to 514 to choose another candidate communication band. Alternatively, if it is determined at 520 that the present battery voltage is higher than the voltage threshold associated with the candidate communication band, the method 500 returns to 508 to select the candidate communication band as the operating communication band.

As in the case of method 400, it will be appreciated in the method 500 that finding a candidate communication band that is suitable for selection as the operating communication band may require determining the suitability of several candidate communication bands and may require retrieving the voltage thresholds associated to each of the possible communication bands stored after the operating communication band in the order of possible communication bands stored at 502 until a suitable communication band is found. However, other techniques of searching through the candidate communication bands are also possible in alternative embodiments.

Referring now to FIG. 6, illustrated therein is an example embodiment of a method 600 for controlling the automatic selection of an operating communication mode for carrying out an ongoing wireless communication wherein the communication may be carried out in communication modes having varying communication protocols and varying communication bands. It will be appreciated that the method 600 is analogous to method 400 and it will be understood that description provided above relating to the method 400 may be adapted to the method 600.

At 602, the total possible communication bands and the total possible communication protocols representing the total possible communication modes that can be selected for carrying out the wireless communication are stored at 602. Each unique combination of a communication band and a communication protocol is viewed as one possible communication mode. Once again, this can be determined based on wireless conditions, such as traffic and data rate efficiency as explained previously.

In other embodiments, only a subset of the total possible communication modes is stored at 602. This may be the case where it is desirable to restrict some of the usable communication modes, for example, due to wireless communication conditions such as traffic in use on other bands or data rate efficiency. In another case, the type of wireless communication, for example voice or data, will limit the number of bands available for use at the operating communication protocol.

The total possible communication modes may be stored at 602 in a preferred order. For example, the communication modes may be ordered based on decreasing order of preference of communication modes. Examples for preference were given previously for method 400. Alternatively, communication modes may be ordered based on decreasing order of the voltage threshold associated with each of the communication modes that are stored at 604.

In some embodiments, communication modes may be ordered based on the preference of communication modes irrespective of the communication protocol or communication band of the modes. Similarly, communication modes may be ordered based on decreasing order of voltage threshold associated with each of the communication modes irrespective of the communication protocol or communication bands of the modes.

In other embodiments, a two-level ordering may be used such that communication modes may be ordered with an emphasis on the communication protocol of the communication mode. For example, all communication modes having a same first communication protocol will be ordered together before all communication modes having a second communication protocol and so on and so forth. This first level of ordering can be based on either preference of protocols or associated voltage thresholds. Communication modes having the same communication protocol are then further ordered at a second level based on the communication bands. This further ordering may be based on preference of communication bands, associated voltages thresholds of each communication band, or traffic for each communication band, or data rate efficiency for each communication band, for example. When such an ordering is used for storing the communication modes, during automatic selection of communication modes for carrying out the wireless communication all communication modes having the same protocol but varying bands will be exhausted as candidate communication modes before other communication modes having a different protocol will be considered as candidate communication modes.

In other embodiments, the two-level ordering may be implemented such that communication modes may be ordered with an emphasis on the communication band of the communication mode. For example, all communication modes having a same first communication band will be ordered together before all communication modes having a second communication band and so on and so forth. This first-level ordering can be based on either preference of bands or associated voltage thresholds. Communication modes having the same communication band are then further ordered at a second level based on the communication protocols. This further ordering may be based on preference of communication protocols or associated voltages thresholds of each communication protocol, or traffic for each communication band, or data rate efficiency for each communication band, for example. When such an ordering is used for storing the communication modes, during automatic selection of communication modes for carrying out the wireless communication, all communication modes having the same band but varying protocols will be exhausted as candidate communication modes before other communication modes having a different band will be considered as candidate communication modes.

To keep track of each communication mode in the order of modes stored at 602, each communication mode may have an associated index number, for example mode(X) where X=1, 2, 3, . . . , etc., in the order of preference specified above. Alternatively, in the embodiments having a two-level ordering of communication, two index numbers may be used to keep track of the communication mode. For example mode (X,Y) can represent a communication mode having band(X) and protocol(Y) or a communication mode having protocol (X) and band(Y). For ease of illustration, the method 600 will be described based on the first ordering technique. When the second ordering technique (i.e. the two-level technique is used), a double nested-loop process can be used where X is incremented by 1 and then the various possibilities are examined by incrementing Y through the various options until a suitable communication mode is selected.

At 604, one voltage threshold is associated to each of the communication modes stored at 602. Each of the voltage thresholds are then stored while maintaining the association with the communication mode. For example, the voltage threshold may be logically stored such that Vth(X) represents the voltage threshold associated with the communication mode having the index number X. In embodiments having a two level ordering, Vth(X,Y) may be used to identify the voltage threshold associated to a communication mode MODE(X,Y).

At 606, a drop threshold is set for the wireless communication. The drop threshold may be set in a way analogous to the setting of the drop threshold at 606 of the method 600. The drop threshold may be set in numerous ways. For example in FIG. 6, the drop threshold is stored as Xmax, representing the maximum index X that can be reached before a wireless communication is terminated. In embodiments having two-level ordering, the drop threshold can be an array of values corresponding to the number of communication modes for a particular hierarchical communication mode (i.e. number of protocols for a selected band, number or bands for a selected protocol, and the like).

At 608, a communication mode is selected from the total possible communication modes stored at 602 as the operating communication mode. For example, the operating communication mode may be the communication mode that provides the highest quality and reliability for the wireless communication. A current index X is set to equal the index number of the operating communication mode to track its order in the ordering of total possible communication modes stored at 602. Where a two-level ordering is used, current indices X and Y may be set to equal the index numbers of the operating communication mode.

At 610, the voltage threshold Vth(X) associated to the operating communication voltage is retrieved using the index X and set as the operating voltage threshold. In embodiments having two-level ordering, voltage threshold Vth(X,Y) is retrieved.

At 612, the present voltage of the battery 130 is monitored to determine if the present battery voltage drops below the operating voltage threshold. This monitoring is analogous to the monitoring performed at 412.

At 614, because the battery voltage level has dropped below the operating threshold voltage for the current operating communication mode, another communication band is probed as a candidate communication mode for continuing the wireless communication. Since the index X is used to track the operating communication mode within the list of possible communication modes, X is incremented by 1 to choose the next communication mode in the order of possible communication modes as the candidate communication mode. In embodiments having two-level ordering, index X and/or Y are incremented appropriately to choose the next communication mode in the order of possible communication modes.

At 616, it is determined whether the drop threshold has been reached. This determination is analogous to the determination made at 416.

If it is determined at 616 that the wireless communication should be terminated, then at 618 the wireless communication is terminated.

If it is determined at 616 that the drop threshold has not been reached, it is further determined at 620 whether the candidate communication mode is suitable for continuing the wireless communication. The determination of the suitability of the candidate communication mode is analogous to the determination performed at 420.

If it is determined at 620 that the present battery voltage is lower than the voltage threshold associated with the candidate communication mode, the method 600 returns to 614 to choose another candidate communication mode. Alternatively, if it is determined at 620 that the present battery voltage is higher than the voltage threshold associated with the candidate communication mode, the method 600 returns to 608 to select the candidate communication mode as the operating communication mode.

As in the case of method 400, it will be appreciated in the method 600 that finding a candidate communication mode that is suitable for selection as the operating communication mode may require determining the suitability of several candidate communication modes and may require retrieving the voltage thresholds associated to each of the possible communication modes stored after the operating communication mode in the order of possible communication modes stored at 502 until a suitable communication mode is found. However, other techniques of searching through the candidate communication modes are also possible in alternative embodiments.

It should be noted that there can be an earlier termination of the methods 400, 500 and 600, which occurs when the wireless communication is terminated and the battery voltage level is still higher than the operating voltage threshold of the operating communication mode.

In some embodiments, when storing the associated voltage thresholds of the various communication bands, if there are two associated voltage thresholds that are the same, then the associated voltage thresholds and the corresponding communication bands can be stored in order of preference of the corresponding communication bands.

It should also be noted that at least one of the techniques of selecting a particular communication protocol, selecting a communication band or selecting both a communication protocol and a communication band in order to extend wireless communication when the battery voltage level is decreasing can be used with any wireless device that is battery powered and can selectively communicate over multiple bands and/or using multiple communication protocols.

It should be noted that other techniques to extend battery life on a wireless device or to extend wireless communication typically deal with analyzing the amount of power that is required for the wireless communication and comparing it to a voltage threshold on the battery and adjusting the power required for the wireless communication such that the voltage threshold on the battery is not violated. This in part is due to the fact that a worst case voltage threshold (in this case the highest of the minimum voltage thresholds) is conventionally assumed even though the transmission power required to communicate using different communication protocols, such as, but not limited to 2G, 3G, 4G or LTE protocols, or to communicate over different communication bands varies. The approach taken by the various embodiments described herein thus includes, in part, recognizing that communicating over different communication bands and/or communication protocols requires varying amounts of power which therefore results in different voltage thresholds and wisely choosing the operating communication mode can allow for a wireless communication to be continued whereas it would have been terminated using conventional techniques that assume worst-case fixed (and therefore higher) voltage thresholds. Accordingly, as the battery voltage of a wireless device decreases, it is still possible to perform wireless communication using the various embodiments described herein whereas it would not be possible using conventional techniques.

It should also be noted that at least some of the elements used to perform at least one of the methods of selecting a communication mode described herein that are implemented via software may be written in a high-level procedural language such as object oriented programming. Accordingly, the program code may be written in C, $C^{++}$ or any other suitable programming language and may comprise modules or classes, as is known to those skilled in object oriented programming. Alternatively, or in addition thereto, at least some of these elements implemented via software may be written in assembly language, machine language or firmware as needed. In either case, the program code can be stored on a non-transitory storage media or on a non-transitory computer readable medium that is readable by a general or special purpose programmable computing device having a processor, an operating system and the associated hardware and software that is necessary to implement the functionality of at least one of the methods of selecting a communication mode described herein. The program code, when read by a processor, configures the processor to operate in a new and specific manner in order to perform at least one of the methods for selecting a communication mode described herein.

In one aspect, in at least one embodiment described herein, there is provided a method for selecting an operating communication mode for carrying out a wireless communication on a communication device powered by a power pack. The method comprises from a plurality of communication modes stored in memory, each of the plurality of communication modes having an associated voltage threshold, selecting a first communication mode as the operating communication mode and carrying out wireless communication in the operating communication mode; monitoring a present power pack voltage level of the power pack to determine if the present power pack voltage level is below the associated voltage threshold of the operating communication mode; when the present power pack voltage level is below the associated voltage threshold of the operating communication mode, selecting a second communication mode having an associated voltage threshold lower than the present power pack voltage level; and continuing to carry out the wireless communication in the second communication mode.

The method further comprises searching for the second communication mode having an associated voltage threshold lower than the present power pack voltage level; and terminating the wireless communication when the second communication mode is not located having an associated voltage threshold lower than the present power pack voltage level.

In some embodiments, the method further comprises storing the plurality of communication modes and the associated voltage thresholds during initiation of the wireless communication based on one or more present wireless communication conditions.

In some embodiments, the present wireless communication conditions comprise at least one of traffic and data rate efficiency.

The method further comprising terminating the wireless communication when the wireless communication is complete.

In some embodiments, the plurality of communication modes are stored in an order based on the associated voltage thresholds of the communication modes.

In some embodiments, the plurality of communication modes are stored in an order based on one of data rate efficiency and quality of wireless communication.

Selecting the second communication mode as the operating communication mode comprises: retrieving an associated voltage threshold corresponding with another stored communication mode; determining whether the retrieved associated voltage threshold is less than the present power pack voltage level; selecting the communication mode corresponding to the retrieved associated voltage threshold as the second communication mode if the retrieved associated voltage threshold is less than the present power pack voltage level; and performing the retrieving, determining and selecting actions until the second communication mode is selected or there are no more associated voltage thresholds to retrieve.

In some embodiments, the wireless communication is carried out in a single selected communication band and the plurality of communication modes that are stored are a plurality of wireless communication protocols for the single selected communication band.

In some embodiments, the wireless communication is carried out in a single selected communication protocol and the plurality of communication modes that are stored are a plurality of wireless communication bands for the single selected communication protocol.

In some embodiments, each of the communication modes comprises a communication band and a communication protocol, the plurality of communication modes are stored in an order at a first level according to the communication protocols of the communication modes, and each of one or more communication modes having the same communication protocol are further ordered at a second level according to the communication bands of the same communication protocol.

In some embodiments, each of the communication modes comprises a communication band and a communication protocol, the plurality of communication modes are stored in an order at a first level according to the communication bands of the communicating modes, and each of one or more communication modes having the same communication band are further ordered at a second level according to the communication protocols of the same communication band.

In another aspect, in at least one embodiment described herein, there is provided a non-transitory computer readable medium comprising a plurality of instructions executable on a microprocessor of a communication device powered by a power pack for adapting the microprocessor to implement a method of selecting an operating communication mode for carrying out a wireless communication on the communication device. The method comprises from a plurality of communication modes stored in memory, each of the plurality of communication modes having an associated voltage threshold, selecting a first communication mode as the operating communication mode and carrying out wireless communication in the operating communication mode; monitoring a present power pack voltage level of the power pack to determine if the present power pack voltage level is below the associated voltage threshold of the operating communication mode; when the present power pack voltage level is below the associated voltage threshold of the operating communication mode, selecting a second communication mode having an associated voltage threshold lower than the present power pack voltage level; and continuing to carry out the wireless communication in the second communication mode.

The computer readable medium further comprises instructions for implementing the method as is further defined by the method described above.

In another aspect, in at least one embodiment described herein, there is provided a system for selecting an operating communication mode for carrying out a wireless communication on a communication device. The system comprises a memory for storing a plurality of communication modes and associated voltage thresholds; an input signal terminal for receiving a present power pack voltage level for a power pack of the communication device; an output signal terminal for conveying one or more control signals corresponding to the operating communication mode; and a processor coupled to the input signal terminal, the memory, and the output signal terminal. The processor is configured to select from the plurality of communication modes a first communication mode as the operating communication mode; monitor the present power pack voltage level of the power pack to determine if the present power pack voltage level is below the associated voltage threshold of the operating communication mode; search for a second communication mode having an associated voltage threshold lower than the present power pack voltage level when the present power pack voltage level is below the associated voltage threshold of the operating communication mode; select the second communication mode as the operating communication mode when the second communication mode is located having an associated voltage threshold lower than the present power pack voltage level; and convey one or more control signals via the output signal terminal to configure the communication device to communicate according to the operating communication mode.

The processor is further configured to convey one or more control signals via the output signal terminal to terminate the wireless communication when the wireless communication is complete or when the second communication mode is not located having an associated voltage threshold lower than the present battery voltage level.

In some embodiments, the processor is further configured to store the plurality of communication modes and the associated voltage thresholds is performed during initiation of the wireless communication based on one or more present wireless communication conditions.

In some embodiments, the plurality of communication modes are stored in an order based on at least one of the associated voltage thresholds of the communication modes, data rate efficiency and quality of wireless communication.

In some embodiments, the wireless communication is carried out in a single selected communication band and the plurality of communication modes that are stored are a plurality of wireless communication protocols for the single selected communication band or the wireless communication is carried out in a single selected communication protocol and the plurality of communication modes that are stored are a plurality of wireless communication bands for the single selected communication protocol.

It should be understood that various modifications can be made to the embodiments described and illustrated herein, without departing from the embodiments, the general scope of which is defined in the appended claims.

The invention claimed is:

1. A method for selecting an operating communication mode for carrying out a wireless communication on a communication device powered by a power pack, the method comprising:
from a plurality of communication modes stored in memory, each of the plurality of communication modes having an associated voltage threshold, selecting a first communication mode as the operating communication mode and carrying out wireless communication in the operating communication mode;
monitoring a present power pack voltage level of the power pack to determine if the present power pack voltage level is below the associated voltage threshold of the operating communication mode;
when the present power pack voltage level is below the associated voltage threshold of the operating communication mode, selecting a second communication mode having an associated voltage threshold lower than the present power pack voltage level; and
continuing to carry out the wireless communication in the second communication mode;
wherein each of the communication modes comprise a first communication parameter and a second communication parameter, the plurality of communication modes are stored in an order at a first level according to the first communication parameter of the communication modes, and each of the one or more communication modes having the same first communication parameter are further ordered at a second level according to the second communication parameter.

2. The method of claim 1, wherein the method further comprises:
searching for the second communication mode having an associated voltage threshold lower than the present power pack voltage level; and
terminating the wireless communication when the second communication mode is not located having an associated voltage threshold lower than the present power pack voltage level.

3. The method of claim 1, further comprising storing the plurality of communication modes and the associated voltage thresholds in the memory during initiation of the wireless communication based on one or more present wireless communication conditions.

4. The method of claim 3, wherein the present wireless communication conditions comprise at least one of traffic and data rate efficiency.

5. The method of claim 1, wherein selecting the second communication mode as the operating communication mode comprises:
retrieving an associated voltage threshold corresponding with another stored communication mode;
determining whether the retrieved associated voltage threshold is less than the present power pack voltage level;
selecting the communication mode corresponding to the retrieved associated voltage threshold as the second communication mode if the retrieved associated voltage threshold is less than the present power pack voltage level; and
performing the retrieving, determining and selecting actions until the second communication mode is selected or there are no more associated voltage thresholds to retrieve.

6. The method of claim 1, wherein the first communication parameter is one of a communication protocol and a communication band, and wherein the second communication parameter is the other of the communication protocol and the communication band.

7. The method of claim 1, wherein selecting the second communication mode having an associated voltage threshold lower than the present power pack voltage level comprises:
considering one or more of the communication modes having a common first-level order and ordered at the second level according to the second communication parameter as candidates for selection as the second communication mode; and
if a second communication mode is not selected from the communication modes having the common first-level order, considering one or more of the communication modes having a common second first-level order and ordered at the second level according to the second communication parameter as candidates for selection as the second communication mode.

8. The method of claim 1, wherein the voltage threshold associated to at least one communication mode is higher than a minimum voltage required for that communication mode.

9. The method of claim 8, wherein a difference between the associated voltage threshold and the minimum voltage allows the selecting of the second communication mode before the power pack voltage level drops below the minimum voltage.

10. A system for selecting an operating communication mode for carrying out a wireless communication on a communication device comprising:
a memory for storing a plurality of communication modes and associated voltage thresholds;
an input signal terminal for receiving a present power pack voltage level for a power pack of the communication device;
an output signal terminal for conveying one or more control signals corresponding to the operating communication mode; and
a processor coupled to the input signal terminal, the memory, and the output signal terminal, the processor being configured to:
select from the plurality of communication modes a first communication mode as the operating communication mode;
monitor the present power pack voltage level of the power pack to determine if the present power pack voltage level is below the associated voltage threshold of the operating communication mode;
search for a second communication mode having an associated voltage threshold lower than the present power pack voltage level when the present power pack voltage level is below the associated voltage threshold of the operating communication mode;
select the second communication mode as the operating communication mode when the second communication mode is located having an associated voltage threshold lower than the present power pack voltage level; and convey one or more control signals via the output signal terminal to configure the communication device to communicate according to the operating communication mode;

wherein each of the communication modes comprise a first communication parameter and a second communication parameter, the plurality of communication modes are stored in an order at a first level according to the first communication parameter of the communication modes, and each of the one or more communication modes having the same first communication parameter are further ordered at a second level according to the second communication parameter.

11. The system of claim 10, wherein the processor is further configured to convey one or more control signals via the output signal terminal to terminate the wireless communication when the wireless communication is complete or when the second communication mode is not located having an associated voltage threshold lower than the present power pack voltage level.

12. The system of claim 10, wherein the processor is further configured to store the plurality of communication modes and the associated voltage thresholds is performed during initiation of the wireless communication based on one or more present wireless communication conditions.

13. The system of claim 12, wherein the present wireless communication conditions comprise at least one of traffic and data rate efficiency.

14. The system of claim 10, wherein the plurality of communication modes are stored in an order based on at least one of the associated voltage thresholds of the communication modes, data rate efficiency and quality of wireless communication.

15. The system of claim 10, wherein selecting the second communication mode as the operating communication mode comprises:
retrieving an associated voltage threshold corresponding with another stored communication mode;
determining whether the retrieved associated voltage threshold is less than the present power pack voltage level;
selecting the communication mode corresponding to the retrieved associated voltage threshold as the second communication mode if the retrieved associated voltage threshold is less than the present power pack voltage level; and
performing the retrieving, determining and selecting actions until the second communication mode is selected or there are no more associated voltage thresholds to retrieve.

16. The system of claim 10, wherein the first communication parameter is one of a communication protocol and a communication band, and wherein the second communication parameter is the other of the communication protocol and the communication band.

17. The system of claim 10, wherein selecting the second communication mode having an associated voltage threshold lower than the present power pack voltage level comprises:
considering one or more of the communication modes having a common first-level order and ordered at the second level according to the second communication parameter as candidates for selection as the second communication mode; and
if a second communication mode is not selected from the communication modes having the common first-level order, considering one or more of the communication modes having a common second first-level order and ordered at the second level according to the second communication parameter as candidates for selection as the second communication mode.

18. The system of claim 10, wherein the voltage threshold associated to at least one communication mode is higher than a minimum voltage required for that communication mode.

19. The system of claim 18, wherein a difference between the associated voltage threshold and the minimum voltage allows the selecting of the second communication mode before the power pack voltage level drops below the minimum voltage.

20. A non-transitory computer readable medium comprising a plurality of instructions executable on a microprocessor of a communication device powered by a power pack for adapting the microprocessor to implement a method of selecting an operating communication mode for carrying out a wireless communication on the communication device, wherein the method comprises:
from a plurality of communication modes stored in memory, each of the plurality of communication modes having an associated voltage threshold, selecting a first communication mode as the operating communication mode and carrying out wireless communication in the operating communication mode;
monitoring a present power pack voltage level of the power pack to determine if the present power pack voltage level is below the associated voltage threshold of the operating communication mode;
when the present power pack voltage level is below the associated voltage threshold of the operating communication mode, selecting a second communication mode having an associated voltage threshold lower than the present power pack voltage level; and
continuing to carry out the wireless communication in the second communication mode;
wherein each of the communication modes comprise a first communication parameter and a second communication parameter, the plurality of communication modes are stored in an order at a first level according to the first communication parameter of the communication modes, and each of the one or more communication modes having the same first communication parameter are further ordered at a second level according to the second communication parameter.

* * * * *